Patented June 27, 1939

2,164,279

UNITED STATES PATENT OFFICE 2,164,279

TREATMENT OF SUBSTANCES CONTAINING TANTALUM AND NIOBIUM

Joseph Pierre Leemans, Hoboken, near Antwerp, Belgium, assignor to Société Générale Metallurgique de Hoboken, Hoboken, near Antwerp, Belgium No Drawing. Application January 27, 1938, Serial No. 187,248. In Great Britain April 9, 1937

2 Claims. (Cl. 75—133)

This invention relates to the treatment of substances containing tantalum and niobium.

The object of the invention is to separate the tantalum from the niobium.

According to the present invention a tantalum and niobium alloy with or without other metals is melted, and a predetermined amount of oxides or oxide compounds of metals capable of displacing the tantalum selectively to the niobium, is thereupon added to the molten charge so as to obtain after melting of the whole mass and reaction, on the one hand a niobium alloy and on the other hand a slag containing the tantalum.

As oxides or oxide compounds capable of effecting the said selective displacement, niobium oxide compounds and/or oxide compounds of one or several metals of the iron group: Fe, Mn, Cr, Co, Ni, may be cited.

The primary material may be mixed prior to the melting, with oxide compounds which have previously been brought to a state of great fineness.

When oxides of niobium are used, the amount of such oxides which is added, should preferably be such as to obtain a displacement by the tantalum of the alloy of substantially the entire amount of niobium contained by the oxides or oxide compounds. Apart from the niobium alloy, such as ferro-niobium, obtained, a slag is obtained containing the tantalum and this slag may be subjected to any known metallurgical process for the recovery of tantalum in a commercial form (metal, alloy, carbide or oxide).

The primary material may be a ferro-tantalum-niobium, in which case it is treated as said above.

The primary material may consist of oxide compounds of tantalum and niobium and it may then be subjected to any known smelting operation so as to concentrate the elements Ta and Nb in a ferro-tantalum-niobium which is then treated as said above.

The smelting may be effected in any suitable metallurgical apparatus; preferably it is effected in an electric furnace.

The oxide compounds may be used in the form of a slag. When oxide compounds of the iron group are used, the oxidized tantalum passes into a slag during the treatment, whilst a niobium alloy, ferro-niobium for instance, is obtained which is poor in Ta.

The oxide compounds may be added to the charge in the solid or liquid state, or the components of the charge may be subjected to a smelting operation after having been crushed to a suitable fineness and intimately mixed together.

The Ta-containing slag produced by the above treatment may be subjected to any known suitable metallurgical process for the recovery of Ta in a commercial form (metal, alloy, carbide, or oxide).

I claim:

1. A process for the production of a niobium alloy, which consists in melting a ferro-alloy of tantalum and niobium, adding such amount of slags containing oxide compounds of niobium that the tantalum of the ferro-alloy shall displace substantially the entire amount of niobium contained by the slag, allowing the melting of the whole mass and reaction to proceed so as to obtain a niobium alloy and a slag containing the tantalum, and separating the niobium alloy from the slag, as set forth.

2. A process for the production of a niobium alloy, which consists in melting a ferro-alloy of tantalum and niobium, adding such amount of slags containing oxide compounds of niobium and tantalum that the tantalum of the ferro-alloy shall displace substantially the entire amount of niobium contained by the slag, allowing the melting of the whole mass and reaction to proceed so as to obtain a niobium alloy and a slag containing the tantalum, and separating the niobium alloy from the slag, as set forth.

JOSEPH PIERRE LEEMANS.